US009148545B2

United States Patent
Atsumi et al.

(10) Patent No.: US 9,148,545 B2
(45) Date of Patent: Sep. 29, 2015

(54) IMAGE PROCESSING APPARATUS, IMAGE PROCESSING METHOD EMPLOYED BY THE SAME, AND NON-TRANSITORY RECORDING MEDIUM STORING COMPUTER READABLE IMAGE PROCESSING PROGRAM (71) Applicant: Konica Minolta, Inc., Chiyoda-ku (JP)

(72) Inventors: Tomoyuki Atsumi, Toyohashi (JP); Takanobu Sugiyama, Toyokawa (JP); Takashi Oikawa, Toyohashi (JP); Tatsuya Kitaguchi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/585,316

(22) Filed: Dec. 30, 2014

(65) Prior Publication Data
US 2015/0201103 A1    Jul. 16, 2015

(30) Foreign Application Priority Data

Jan. 14, 2014  (JP) .................................. 2014-004673

(51) Int. Cl.
*H04N 1/21* (2006.01)
*H04N 1/41* (2006.01)
*H04N 1/32* (2006.01)

(52) U.S. Cl.
CPC ............. *H04N 1/21* (2013.01); *H04N 1/32363* (2013.01); *H04N 1/41* (2013.01); *H04N 2201/0094* (2013.01)

(58) Field of Classification Search
CPC ... G06F 3/1454; G06F 8/38; G09G 2370/022; G09G 2370/027; G09G 2370/042; H04N 1/32358; H04N 1/32448; H04N 1/00681; H04N 1/00708; H04N 1/00721; H04N 1/32363; H04N 2201/3288; H04N 2201/329; H04N 2201/3295; H04N 2201/3298
USPC ........................................................ 358/1.17
See application file for complete search history.

(56) References Cited

U.S. PATENT DOCUMENTS 5,710,638 A *  1/1998  Yamamoto et al. ............ 358/404
6,870,634 B1 *  3/2005  Morikawa .................... 358/1.16

FOREIGN PATENT DOCUMENTS

JP       2006-020029 A    1/2006

* cited by examiner

*Primary Examiner* — Irina Cruz
(74) *Attorney, Agent, or Firm* — Buchanan Ingersoll & Rooney PC (57) ABSTRACT An image processing apparatus includes: an image input unit which inputs image data per page; a sub-memory unit which stores the image data input from the image input unit; an encoding unit which encodes the image data stored in the sub-memory unit; a main memory unit which stores the image data encoded by the encoding unit; a non-volatile storage unit which stores the encoded image data stored in the main memory unit; and a processor which executes processing of discriminating a memory size of the main memory unit and the sub-memory unit and switching between first input processing and second input processing to be executed in accordance with the discriminated memory size of the main memory unit and the sub-memory unit.

14 Claims, 9 Drawing Sheets

| NUMBER | SYSTEM SPEED | SUB-MEMORY SIZE | MAIN MEMORY SIZE | SUB-MEMORY ARRANGEMENT | MAIN MEMORY ARRANGEMENT | IMAGE INPUT METHOD |
|---|---|---|---|---|---|---|
| 1 | L | S | S | BAND BUFFER | MEMORY AREA CORRESPONDING TO TWO PAGES | 1 |
| 2 | L | S | L | BAND BUFFER | MEMORY AREA CORRESPONDING TO THREE PAGES | 1 |
| 3 | L | L | S | PAGE BUFFER x 1 | MEMORY AREA CORRESPONDING TO ONE PAGE | 2 |
| 4 | L | L | L | BAND BUFFER | MEMORY AREA CORRESPONDING TO THREE PAGES | 1 |
| 5 | M | S | S | BAND BUFFER | MEMORY AREA CORRESPONDING TO THREE PAGES | 1 |
| 6 | M | S | L | BAND BUFFER | MEMORY AREA CORRESPONDING TO FOUR PAGES | 1 |
| 7 | M | L | S | PAGE BUFFER x 2 | MEMORY AREA CORRESPONDING TO ONE PAGE | 2 |
| 8 | M | L | L | BAND BUFFER | MEMORY AREA CORRESPONDING TO FOUR PAGES | 1 |
| 9 | H | S | S | BAND BUFFER | MEMORY AREA CORRESPONDING TO FOUR PAGES | 1 |
| 10 | H | S | L | BAND BUFFER | MEMORY AREA CORRESPONDING TO FIVE PAGES | 1 |
| 11 | H | L | S | BAND BUFFER | MEMORY AREA CORRESPONDING TO FOUR PAGES | 1 |
| 12 | H | L | L | BAND BUFFER | MEMORY AREA CORRESPONDING TO FIVE PAGES | 1 |

| SUB-MEMORY \ MAIN MEMORY | ONE PAGE | TWO PAGES | THREE PAGES | FOUR PAGES |
|---|---|---|---|---|
| BAND BUFFER | — | LOW SPEED | MIDDLE SPEED | HIGH SPEED |
| SINGLE-PAGE BUFFER | LOW SPEED | — | — | — |
| TWO-PAGE BUFFER | MIDDLE SPEED | — | — | — |

FIG. 3B

SUB-MEMORY

| BAND BUFFER | USED AS RING MEMORY. MULTIPLE PAGES NEED TO BE SAVED IN MAIN MEMORY TO AVOID OVERWRITE. |
|---|---|
| SINGLE-PAGE BUFFER | A3 ORIGINAL CAN BE SUBJECTED TO SINGLE-PAGE BUFFERING. A4-SIZED ORIGINAL CAN BE SUBJECTED TO TWO-PAGE BUFFERING SO THAT READ SPEED OF SMALL SIZED ORIGINAL CAN BE RELATIVELY HIGH. READ SPEED OF LARGE SIZED ORIGINAL IS DECREASED. |
| TWO-PAGE BUFFER | A3 ORIGINAL CAN BE SUBJECTED TO TWO-PAGE BUFFERING. ORIGINAL OF ANY SIZE CAN BE SUBJECTED TO TWO-PAGE BUFFERING SO THAT READ SPEED CAN BE RELATIVELY HIGH REGARDLESS OF ORIGINAL SIZE. |

| NUMBER | SYSTEM SPEED | SUB-MEMORY SIZE | MAIN MEMORY SIZE | SUB-MEMORY ARRANGEMENT | MAIN MEMORY ARRANGEMENT | IMAGE INPUT METHOD |
|---|---|---|---|---|---|---|
| 1 | L | S | S | BAND BUFFER | MEMORY AREA CORRESPONDING TO TWO PAGES | 1 |
| 2 | L | S | L | BAND BUFFER | MEMORY AREA CORRESPONDING TO THREE PAGES | 1 |
| 3 | L | L | S | PAGE BUFFER x 1 | MEMORY AREA CORRESPONDING TO ONE PAGE | 2 |
| 4 | L | L | L | BAND BUFFER | MEMORY AREA CORRESPONDING TO THREE PAGES | 1 |
| 5 | M | S | S | BAND BUFFER | MEMORY AREA CORRESPONDING TO THREE PAGES | 1 |
| 6 | M | S | L | BAND BUFFER | MEMORY AREA CORRESPONDING TO FOUR PAGES | 1 |
| 7 | M | L | S | PAGE BUFFER x 2 | MEMORY AREA CORRESPONDING TO ONE PAGE | 2 |
| 8 | M | L | L | BAND BUFFER | MEMORY AREA CORRESPONDING TO FOUR PAGES | 1 |
| 9 | H | S | S | BAND BUFFER | MEMORY AREA CORRESPONDING TO FOUR PAGES | 1 |
| 10 | H | S | L | BAND BUFFER | MEMORY AREA CORRESPONDING TO FIVE PAGES | 1 |
| 11 | H | L | S | BAND BUFFER | MEMORY AREA CORRESPONDING TO FOUR PAGES | 1 |
| 12 | H | L | L | BAND BUFFER | MEMORY AREA CORRESPONDING TO FIVE PAGES | 1 |

IMAGE PROCESSING APPARATUS, IMAGE PROCESSING METHOD EMPLOYED BY THE SAME, AND NON-TRANSITORY RECORDING MEDIUM STORING COMPUTER READABLE IMAGE PROCESSING PROGRAM

The entire disclosure of Japanese Patent Application No. 2014-004673 filed on Jan. 14, 2014 including description, claims, drawings, and abstract are incorporated herein by reference in its entirety.

BACKGROUND OF THE INVENTION

1. Field of the Invention

The present invention relates to an image processing apparatus such as an MFP (Multi Function Peripherals) that is a multifunctional digital image forming apparatus, an image processing method employed by the apparatus, and a non-transitory recording medium storing a computer readable image processing program.

2. Description of the Related Art

When image data is to be input from a device such as a high-speed scanner device included in an image processing apparatus that cannot be stopped in the middle once an image starts to be input, it is required that a region be provided to retain a single page of raw data or compressed encoded data in order to ensure that a single page's worth of the image data is input.

A memory incorporated in the image processing apparatus includes a main memory which is disposed to be freely accessed from a CPU and be expanded as needed, and a sub-memory which can be accessed via DMA (Direct Memory Access) transfer only and has the size just enough for the device configuration. There is also required an auxiliary storage device which holds a large amount of encoded data.

Cost-wise, the main memory configured to be expanded as needed is more expensive than the sub-memory. Moreover, the main memory and the sub-memory need to be disposed to be accessed in separate channels in order to secure the band required for image transfer.

When the input of the single page's worth of image data is ensured by the main memory, the image can be input at high speed by using an automatic original feeding unit mounted to the scanner device. The number of pages securely input to achieve the maximum input speed varies depending on the configuration of the automatic original feeding unit but, in general, the input speed can be increased by using more memory.

Some image processing apparatuses including an automatic original feeding unit with a dual scan technique are configured to be able to save image data worth four pages of A3-sized originals at once into the main memory, for example. An image processing apparatus including a normal automatic original feeding unit is often configured to be able to save two pages' worth of image data at once into the main memory.

The automatic original feeding unit can read the original at high speed since a memory area provided to save the image can be secured one after another in the main memory.

On the other hand, the size of the expensive main memory needs to be decreased in order to provide a low-speed, inexpensive image processing apparatus. Accordingly, the main memory can be adapted to save the image data worth a single page of the A3-sized original in order to be provided in the minimum size. When the main memory is adapted to hold the image data worth the single page of the original input from the scanner device, the image data of a next original cannot be input until after the image data being held is saved in the auxiliary storage device such as a hard disk device. Moreover, the image data for output cannot be read from the auxiliary storage device while the image data is being input, whereby the performance is notably degraded.

Accordingly, the less expensive sub-memory is provided with a buffer per page to save the encoded data per band successively into the auxiliary storage device, so that the input of the next image data can be started right after completing the input of the current image data. Moreover, the memory area in the main memory is not used extensively when inputting the image data, so that the image data can be output while the image data is being input and that the efficiency is improved.

As described above, each of the inexpensive image processing apparatus and the image processing apparatus equipped with the sufficient main memory and supporting high-speed image input has its own method of inputting the image data suitable for each apparatus, and thus also differs in the size of the memory area to be secured in the main memory and the sub-memory.

Therefore, the image processing apparatus in the manufacturing process thereof is equipped with the sub-memory and the main memory each having the memory size large enough to be able to secure the required memory area, in accordance with the characteristic of the image processing apparatus. When inputting the image data from the scanner device, a control unit of the image processing apparatus secures the memory area in each of the sub-memory and the main memory and performs input processing of the image data where, in the related art, such control unit has been configured individually for each image processing apparatus to perform the intended input processing of the image data.

Note that JP 2006-20029 A discloses an image input/output apparatus in which, when an image output unit cannot be stopped once started up, a code memory secures the memory capacity large enough to accommodate all data corresponding to pages being output while a bit map memory secures a memory size per band less than a page and, when the image output unit is not the output unit that cannot be stopped once started up, both the code memory and a second bit map memory are secured per band.

However, the control unit cannot be standardized where the control unit of the image processing apparatus is configured individually for each image processing apparatus to perform the intended input processing of the image data as described above, thereby causing an increase in cost.

Note that the technique described in JP 2006-20029 A does not disclose anything related to the standardization of the control unit pertaining to the input processing of the image data using the sub-memory and the main memory and thus does not provide a solution to the aforementioned problem.

SUMMARY OF THE INVENTION

The present invention has been made in order to solve the aforementioned problem, and an object of the present invention is to provide an image processing apparatus and an image processing method which can standardize the control unit performing the input processing of the image data even when an input processing method to perform the input processing of the image data per page by using the main memory and the sub-memory differs in each image processing apparatus, as well as to provide an image processing program.

The aforementioned problems are solved by the following units.

(1) To achieve at least the abovementioned object, according to an aspect, an image processing apparatus reflecting one aspect of the present invention comprises: an image input unit which inputs image data per page; a sub-memory unit which stores the image data input from the image input unit; an encoding unit which encodes the image data stored in the sub-memory unit; a main memory unit which stores the data encoded by the encoding unit; a non-volatile storage unit which stores the encoded image data stored in the main memory unit; and a processor which executes processing of discriminating a memory size of the main memory unit and the sub-memory unit and switching between first input processing and second input processing in accordance with the discriminated memory size of the main memory unit and the sub-memory unit, wherein the first input processing is processing which stores in the sub-memory unit a part of a single page's worth of the image data input by the image input unit, secures in the main memory a memory area capable of storing the maximum capacity of the single page's worth of the image data to store the image data stored in the sub-memory unit and encoded by the encoding unit, and secures a memory area capable of storing the maximum capacity of a next single page's worth of image data in the main memory unit before storing the image data stored in the main memory unit into the non-volatile storage unit, and the second input processing is processing which secures in the sub-memory unit a memory area capable of storing the maximum capacity of the image data per page input by the image input unit, temporarily stores image data formed by encoding a part of the image data stored in the sub-memory unit into the main memory unit, stores the temporarily stored image data into the non-volatile storage unit, and then erases the temporarily stored image data.

(2) To achieve at least the abovementioned object, according to an aspect, an image processing method employed by an image processing apparatus reflecting one aspect of the present invention comprises: an image input step of inputting image data per page; a step of storing in a sub-memory unit the image data input in the image input step; an encoding step of encoding the image data stored in the sub-memory unit; a step of storing in a main memory unit the image data encoded in the encoding step; a step of storing in a non-volatile storage unit the encoded data stored in the main memory unit; a memory size discrimination step of discriminating a memory size of the main memory unit and the sub-memory unit; and a control step of executing processing while switching between first input processing and second input processing in accordance with the memory size of the main memory unit and the sub-memory unit discriminated in the memory size discrimination step, wherein the first input processing is processing which stores in the sub-memory unit a part of a single page's worth of the image data input in the image input step, secures in the main memory unit a memory area capable of storing the maximum capacity of the single page's worth of the image data to store the image data stored in the sub-memory unit and encoded in the encoding step, and secures a memory area capable of storing the maximum capacity of a next single page's worth of image data in the main memory unit before storing the image data stored in the main memory unit into the non-volatile storage unit, and the second input processing is processing which secures in the sub-memory unit a memory area capable of storing the maximum capacity of the image data per page input in the image input step, temporarily stores image data formed by encoding a part of the image data stored in the sub-memory unit into the main memory unit, stores the temporarily stored image data into the non-volatile storage unit, and then erases the temporarily stored image data.

(3) To achieve at least the abovementioned object, according to an aspect, a non-transitory recording medium storing a computer readable image processing program reflecting one aspect of the present invention causes a computer of an image processing apparatus to execute: an image input step of inputting image data per page; a step of storing in a sub-memory unit the image data input in the image input step; an encoding step of encoding the image data stored in the sub-memory unit; a step of storing in a main memory unit the data encoded in the encoding step; a step of storing in a non-volatile storage unit the encoded image data stored in the main memory unit; a memory size discrimination step of discriminating a memory size of the main memory unit and the sub-memory unit; and a control step of executing processing while switching between first input processing and second input processing in accordance with the memory size of the main memory unit and the sub-memory unit discriminated in the memory size discrimination step, wherein the first input processing is processing which stores in the sub-memory unit a part of a single page's worth of the image data input in the image input step, secures in the main memory unit a memory area capable of storing the maximum capacity of the single page's worth of the image data to store the image data stored in the sub-memory unit and encoded in the encoding step, and secures a memory area capable of storing the maximum capacity of a next single page's worth of image data in the main memory unit before storing the image data stored in the main memory unit into the non-volatile storage unit, and the second input processing is processing which secures in the sub-memory unit a memory area capable of storing the maximum capacity of the image data per page input in the image input step, temporarily stores image data formed by encoding a part of the image data stored in the sub-memory unit into the main memory unit, stores the temporarily stored image data into the non-volatile storage unit, and then erases the temporarily stored image data.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3A is a table illustrating a relationship between a system speed of an image processing apparatus and a basic configuration of each of a main memory and a sub-memory, while

DESCRIPTION OF THE PREFERRED EMBODIMENTS

Hereinafter, an embodiment of the present invention will be described with reference to the drawings. However, the scope of the invention is not limited to the illustrated examples.

Figure 1:
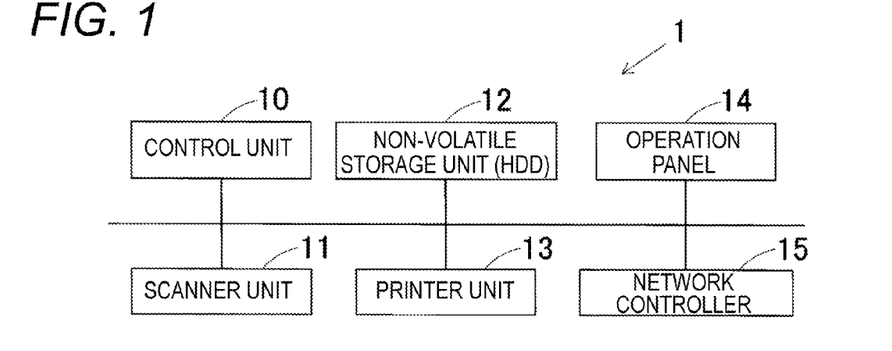
FIG. 1 is a block diagram illustrating a basic configuration of an image processing apparatus according to an embodiment of the present invention.

FIG. 1 is a block diagram illustrating a basic configuration of an image processing apparatus 1 according to an embodiment of the present invention. In the present embodiment, the aforementioned MFP that is a multifunctional digital image forming apparatus equipped with a copy function, a printer function, a scan function and the like is used as the image processing apparatus.

The image processing apparatus 1 includes a control unit 10, a scanner unit 11, a non-volatile storage unit 12, a printer unit 13, an operation panel 14, a network controller (NIC) 15 and the like.

The control unit 10 has control over the entire image processing apparatus 1 and performs control to enable a basic function such as the copy function, the printer function, the scan function, and a facsimile function. The control unit further executes input processing to be described later against image data per page of an original read by the scanner unit 11.

The scanner unit 11 is an image input unit which reads an image of an original that is placed on a document platen (not shown) or successively conveyed by an automatic document feeder (not shown) referred to as an ADF to convert the image into image data.

The non-volatile storage unit 12 is configured by a non-volatile storage device such as a hard disk device (HDD) to store the image data of the original read by the scanner unit 11 and subjected to the input processing by the control unit 10, data transmitted from another image forming apparatus or a user terminal, and various applications. The non-volatile storage unit 12 being a non-volatile storage device, the image data stored therein is not erased even when the power of the image processing apparatus 1 is turned off.

The printer unit 13 is adapted to print the image data of the original read by the scanner unit 11 and print data from the user terminal in accordance with a specified mode.

The operation panel 14 is used to perform various input operations and includes a display unit formed of a touch-panel liquid crystal or the like displaying a message or an operation screen, and a key input unit including a numeric key, a start key, and a stop key.

The network controller 15 is adapted to transmit/receive data to/from another image forming apparatus on a network or another external device such as the user terminal by controlling communication therewith.

Figure 2:
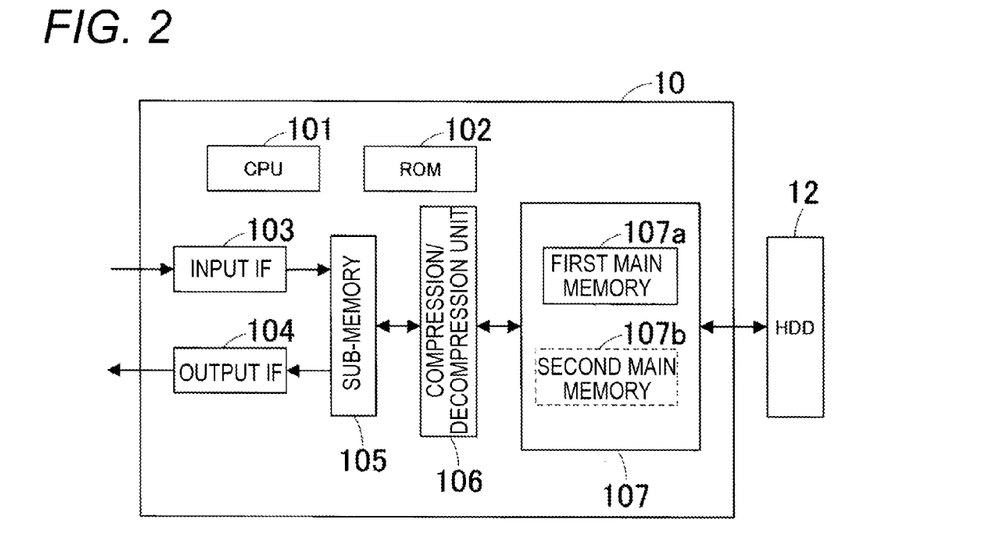
FIG. 2 is a block diagram illustrating a configuration of a control unit.

FIG. 2 is a block diagram illustrating a configuration of the control unit 10.

The control unit 10 includes a CPU 101, a ROM 102, an input interface (noted as input IF) 103, an output interface (noted as output IF) 104, a sub-memory 105, a compression/decompression unit 106, and a main memory 107.

The CPU 101 has control over the entire image processing apparatus 1 by operating in accordance with an operation program recorded in the ROM 102 or the like. In the present embodiment, the CPU particularly performs an input processing control against the image data of the original read by the scanner unit 11, namely a control related to processing of securing a memory area in the main memory 107 and the sub-memory 105 and writing/reading the image data, as well as a control of writing/reading the image data to/from the storage unit 12, a control related to processing of erasing the image data, and a control of a compression (encoding) operation and a decompression (decoding) operation performed on the compression/decompression unit 106.

The ROM 102 is a memory which stores the operation program or the like of the CPU 101.

The input interface 103 receives the image data transmitted from the scanner unit 11 or the like and sends the data to the sub-memory 105, whereas the output interface 104 is adapted to send the image data stored in the storage unit 12 formed of the HDD or the like to the outside of the control unit 10.

The sub-memory 105 temporarily stores the image data input from outside the control unit 10 as well as the image data output to the outside, and thus functions as a buffer memory. The sub-memory 105 can be accessed via DMA (Direct Memory Access) transfer only and is provided in the size just large enough for the device configuration.

The compression/decompression unit 106 compresses the input image data in a predetermined format and decompresses the compressed image data that is read from the storage unit 12.

The main memory 107 is adapted to temporarily store the image data compressed by the compression/decompression unit 106 as well as the compressed image data read from the storage unit 12. The main memory 107 can be freely accessed from the CPU 101 and is disposed to be expanded when needed. While the present embodiment is configured to be able to add a single second main memory 107b to a first main memory 107a that is the basic configuration, two or more of the second main memories 107b may be added as well. Configured to be expanded as described above, the main memory 107 is generally more expensive than the sub-memory 105.

In terms of the cost or the like related to the image processing apparatus 1, the main memory 107 and the sub-memory 105 each having the memory size according to a system speed that is the processing speed of the image processing apparatus 1 are mounted in advance in the present embodiment, and an input processing method of the image data is preset as well according to the memory size of the main memory 107 and the sub-memory 105 being mounted.

There will be described below the relationship among the system speed of the image processing apparatus 1, the configuration of the main memory 107 and the sub-memory 105, and the input processing method of the image data. Note that the basic configuration of the sub-memory 105 includes only the first main memory 107a that is non-expandable.

[1] Basic Configuration where System Speed is Low (1) When Sub-Memory 105 with Small Memory Size is Used The sub-memory 105 is adapted to function as a band buffer and used as a ring memory, where the image data input through the input interface 103 is stored per band for each portion of a single page and then sent to the compression/decompression unit 106. That is, the sub-memory 105 uses a memory area corresponding to the size capable of storing a portion of the single page's worth of the image data.

On the other hand, the main memory 107 secures a memory area capable of storing the maximum capacity of the single page's worth of the image data so that the image data compressed by the compression/decompression unit 106 is stored in the secured memory area. The main memory 107 further secures a memory area capable of storing the maximum capacity of a next single page's worth of image data before storing the aforementioned stored image data into the non-volatile storage unit 12. In other words, the total of two pages' worth of the memory area needs to be secured in the main memory 107, whereby the main memory 107 being mounted has the memory size large enough to be able to secure the two pages' worth of the memory area.

Note that in the present embodiment, image data corresponding to a single page of an A3-sized original is set as the maximum capacity of the single page's worth of the image data, and the single page's worth of the memory area secured in the main memory 107 is calculated on the assumption that raw data uncompressed by the compression/decompression unit 106 is stored. The same can be said of the following description. The memory area may instead be calculated on the assumption that compressed data is stored.

When the memory area capable of storing the maximum capacity of the two pages' worth of the image data is secured in the main memory 107, a read speed is decreased because a plurality of A3-sized originals cannot be read in succession. Note, however, that a read speed of a small-sized original such as an A4-sized original used more frequently is much the same as that of a high-speed machine because of the setting based on the A3-sized original as described above. Moreover, the memory area capable of storing the maximum capacity of the two pages' worth of the image data is secured in the main memory 107, so that the input of the image data performed by reading the original does not compete with reading of the image data from the non-volatile storage unit 12 in terms of securing the memory area and that the reading of the original and printing can be performed simultaneously.

Note that the read speed may be increased by adding the second main memory 107b in addition to the first main memory 107a installed in a fixed manner and securing a memory area capable of storing the maximum capacity of a total of no less than three pages' worth of image data.

(2) When Sub-Memory 105 with Large Memory Size is Used

Here, the sub-memory 105 is adapted to function as a single-page buffer to secure the memory area capable of storing the maximum capacity of the single page's worth of the image data input through the input interface 103.

On the other hand, the main memory 107 used here has the memory size with the memory area capable of storing the maximum capacity of the single page's worth of the image data. The CPU 101 controls the compression/decompression unit 106 to successively decompress a part of the image data stored in the sub-memory 105, causes the main memory 107 to temporarily store the decompressed image data, further causes the non-volatile storage unit 12 to store the temporarily stored image data, and then erases the data from the main memory 107.

Although the memory area capable of storing only the single page's worth of the image data is secured in the main memory 107 in this case, the sub-memory 105 is adapted to function as the single-page buffer so that the input of the image data performed by reading the original does not compete with reading of the image data from the non-volatile storage unit 12 in terms of securing the memory area and that the reading of the original and printing can be performed simultaneously. Note, however, that a read speed is decreased because a plurality of A3-sized originals cannot be read in succession.

Note that when the memory size of the main memory 107 is increased by the addition of the second main memory 107b while using the sub-memory 105 with the large memory size in the present embodiment, it is configured to input the image data to the sub-memory 105 per band as described in (1) above.

[2] Basic Configuration where System Speed is Set to Middle Speed (1) When Sub-Memory 105 with Small Memory Size is Used The sub-memory 105 is adapted to function as the band buffer and used as the ring memory, where the image data input through the input interface 103 is stored per band for each portion of a single page of data and then sent to the compression/decompression unit 106. That is, the sub-memory 105 uses a memory area corresponding to the size capable of storing a portion of the single page's worth of the image data.

On the other hand, the main memory 107 secures a memory area capable of storing the maximum capacity of the single page's worth of the image data so that the image data stored in the sub-memory 105 and compressed by the compression/decompression unit 106 is stored in the secured memory area. Moreover, the main memory 107 secures a memory area capable of storing the maximum capacity of a next single page's worth of image data and stores the image data before storing the aforementioned stored image data in the non-volatile storage unit 12, and further secures a memory area capable of storing the maximum capacity of a next single page's worth of image data before storing the stored image data in the non-volatile storage unit 12. In other words, the total of three pages' worth of the memory area is secured in the main memory 107, whereby the main memory 107 being mounted has the memory size large enough to be able to secure the three pages' worth of the memory area.

The memory area capable of storing the three pages' worth of the image data is secured in the main memory 107, so that the input of the image data performed by reading the original does not compete with reading of the image data from the non-volatile storage unit 12 in terms of securing the memory area and that the reading of the original and printing can be performed simultaneously. Moreover, the read speed is not decreased because a plurality of A3-sized originals can be read in succession.

Note that a memory area capable of storing a total of no less than four pages' worth of image data may be secured by adding the second main memory 107b in addition to the first main memory 107a installed in a fixed manner. In this case, the performance is not degraded when executing a multi-job where a plurality of jobs is performed concurrently.

(2) When Sub-Memory with Large Memory Size is Used

Here, the sub-memory 105 is adapted to function as a two-page buffer to secure a memory area capable of storing the maximum capacity of two pages' worth of image data input through the input interface 103.

On the other hand, the main memory 107 used here has the memory size with the memory area capable of storing the maximum capacity of the single page's worth of the image data. The CPU 101 controls the compression/decompression unit 106 to successively decompress a part of the image data stored in the sub-memory 105, causes the main memory 107 to temporarily store the decompressed image data, further causes the non-volatile storage unit 12 to store the temporarily stored image data, and then erases the data from the main memory 107.

Although the memory area capable of storing only the single page's worth of the image data is secured in the main memory 107 in this case, the sub-memory 105 is adapted to function as the two-page buffer so that the input of the image data performed by reading the original does not compete with reading of the image data from the non-volatile storage unit 12 in terms of securing the memory area and that the reading of the original and printing can be performed simultaneously. Moreover, the read speed is not decreased because a plurality of A3-sized originals can be read in succession.

Note that when the second main memory 107b is added while using the sub-memory 105 with the large memory size in the present embodiment, it is configured to input the image data to the sub-memory 105 per band.

[3] Basic Configuration where System Speed is High

The sub-memory 105 is adapted to function as the band buffer and used as the ring memory, where the image data input through the input interface 103 is stored per band for each portion of a single page of data and then sent to the compression/decompression unit 106. That is, the sub-memory 105 uses a memory area corresponding to the size capable of storing a portion of the single page's worth of the image data.

On the other hand, the main memory 107 secures a memory area capable of storing the maximum capacity of the single page's worth of the image data so that the image data stored in the sub-memory 105 and compressed by the compression/decompression unit 106 is stored in the secured memory area. The main memory 107 further secures a memory area capable of storing the maximum capacity of a next single page's worth of image data and stores the image data before storing the aforementioned stored image data into the non-volatile storage unit 12. The total of four pages' worth of the memory area is secured in the main memory 107 to be able to perform such processing on the total of four pages of image data, whereby the main memory 107 being mounted has the memory size large enough to be able to secure the four pages' worth of the memory area.

The memory area capable of storing the four pages' worth of the image data is secured in the main memory 107, so that the input of the image data performed by reading the original does not compete with reading of the image data from the non-volatile storage unit 12 in terms of securing the memory area and that the reading of the original and printing can be performed simultaneously. Moreover, the read speed is not decreased because a plurality of A3-sized originals can be read in succession. The performance is not degraded either when executing the multi-job.

Note that a memory area capable of storing a total of no less than five pages' worth of image data may be secured by adding the second main memory 107b in addition to the first main memory 107a installed in a fixed manner. In this case, the performance can be further enhanced when executing the multi-job.

Figure 3A:
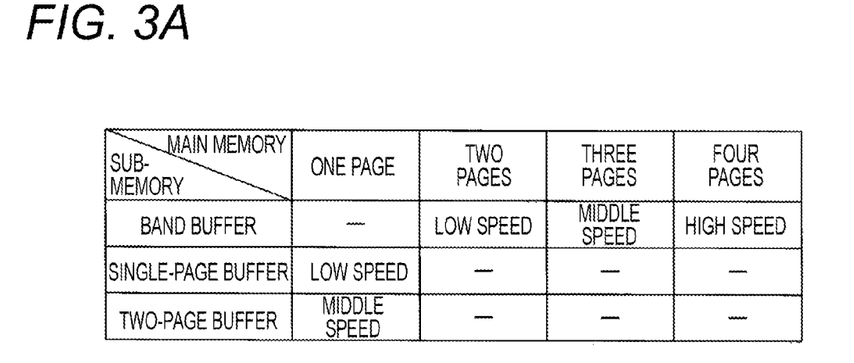
Figure 3B:
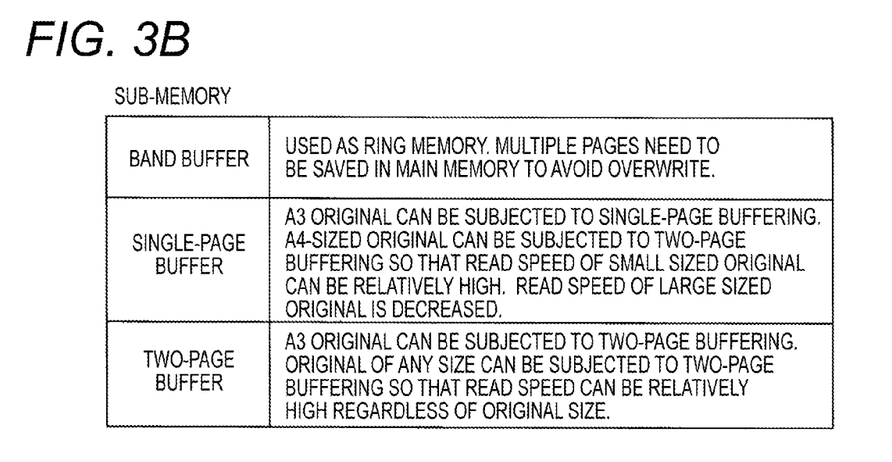
FIG. 3B is a table describing a configuration of the sub-memory.

The aforementioned relationship between the system speed of the image processing apparatus 1 and the basic configuration of each of the main memory 107 and the sub-memory 105 is all illustrated in a table in FIG. 3A. FIG. 3B is a table describing the configuration of the sub-memory 105.

Next, the operation of the image processing apparatus 1 will be described with reference to a flowchart.

Note that the operation is executed when the CPU 101 is operated according to an operation program saved in a recording medium such as the ROM 102.

Figure 4:
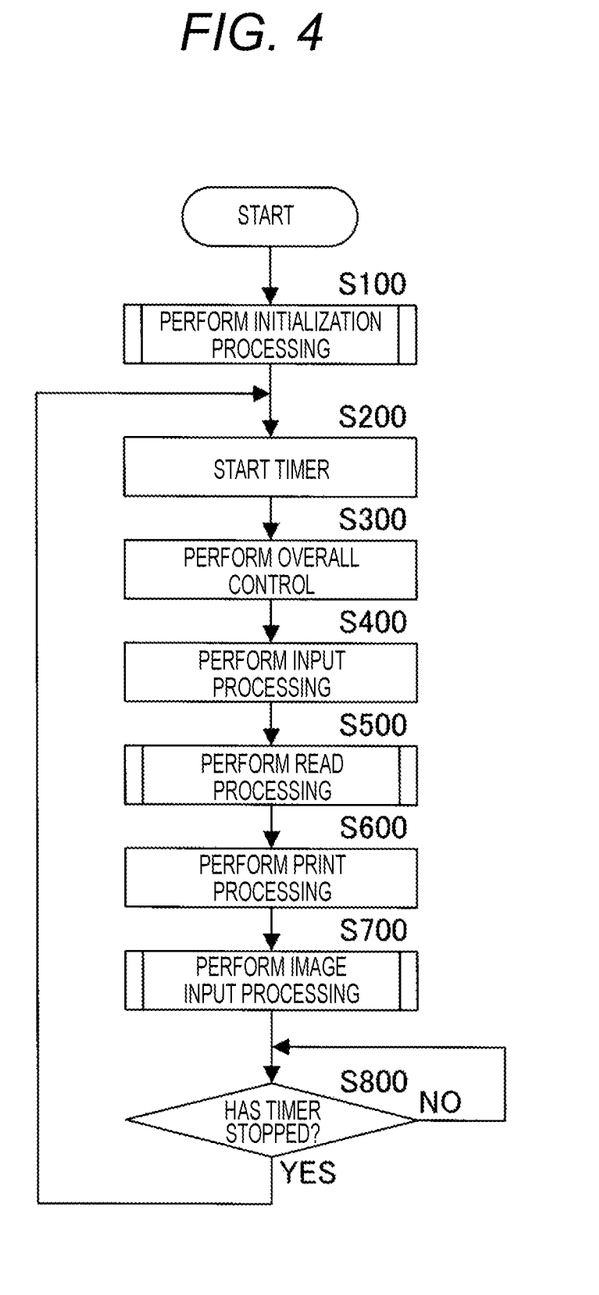
FIG. 4 is a flowchart illustrating an overall operation of the image processing apparatus.

FIG. 4 is the flowchart illustrating an overall operation of the image processing apparatus 1.

Once the program is started with the reset of the CPU 101, initialization processing is performed in step S100. The initialization processing will be described later.

Next, an internal timer is started in step S200, followed by control processing performed on the entire image processing apparatus 1 in step S300 and input processing with respect to an input from the operation panel or the like in step S400.

Subsequently, read processing is performed in step S500, followed by print processing in step S600 and image input processing in step S700. The read processing and the image input processing will be described later.

Then, one waits for the timer to stop in step S800 (NO in step S800) and, when the timer has stopped (YES in step S800), the processing is repeated from step S200.

Figure 5:
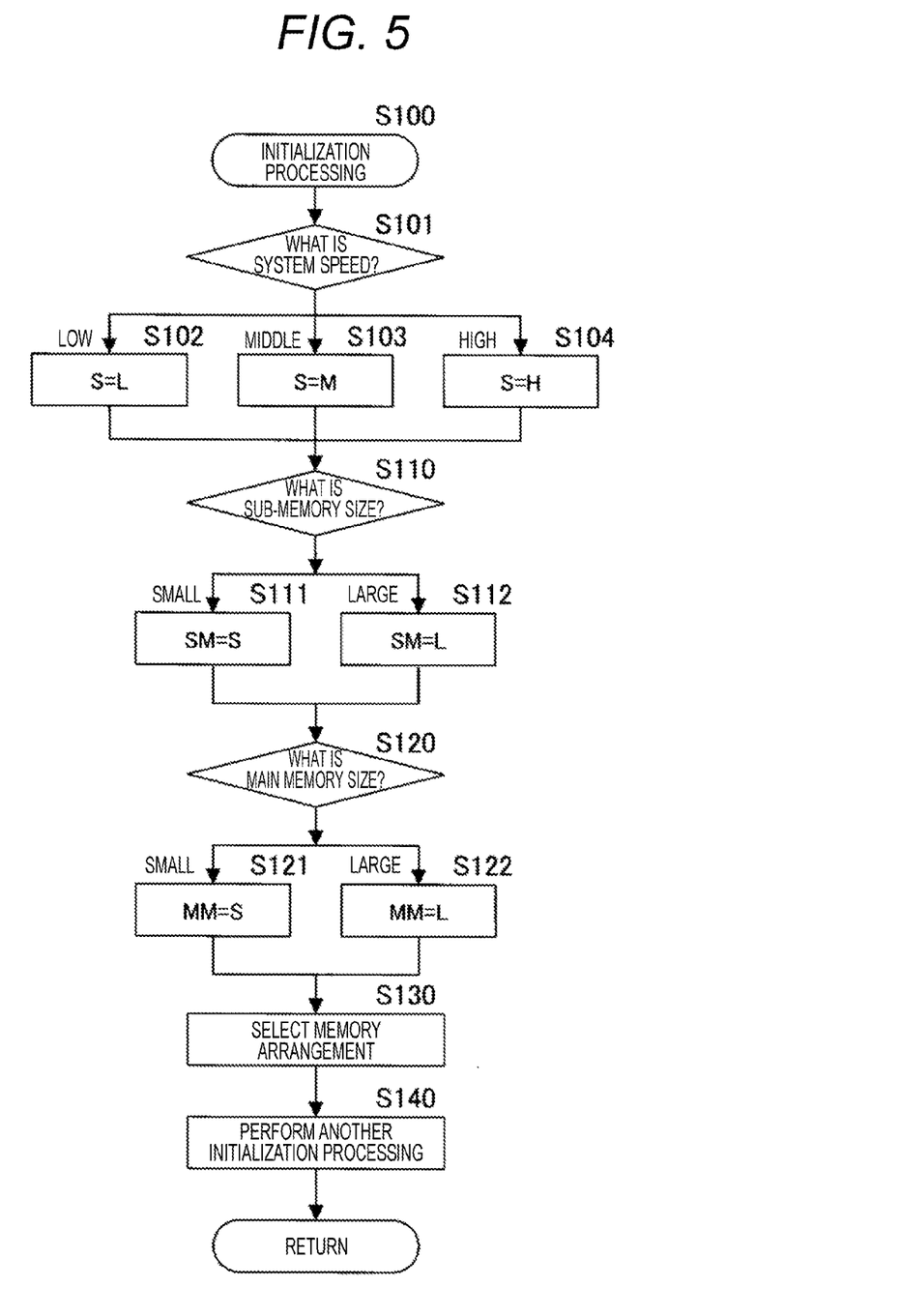
FIG. 5 is a flowchart illustrating the detail of initialization processing (step S100) in the flowchart illustrated in FIG. 4.

FIG. 5 is a flowchart illustrating the detail of the initialization processing (step S100) in the flowchart illustrated in FIG. 4.

The initialization processing particularly performs selection of the arrangement of the memory area (also simply referred to as a memory arrangement) according to the system speed of the image processing apparatus 1 and the memory size of the main memory 107 and the sub-memory 105 as well as selection of an input method of the image data (also simply referred to as an image input method).

The system speed is determined first in step S101. The image processing apparatus 1 saves beforehand, in the ROM 102, a file storing a defined value of the system speed corresponding to the device configuration so that the CPU 101 reads the file to determine the system speed. Specifically, it is determined that the system speed is low speed when the speed is slower than a preset first predetermined value, middle speed when the speed equals the first predetermined value or faster but slower than a preset second predetermined value (where the first predetermined value<the second predetermined value), and high speed when the speed equals the second predetermined value or faster.

System speed S is set to L (Low) in step S102 when the system speed is low speed. The system speed S is set to M (Middle) in step S103 when in middle speed. The system speed S is set to H (High) in step S104 when in high speed.

Next, the memory size (memory capacity) of the sub-memory 105 is determined in step S110. A sub-memory size SM is set to S (Small) in step S111 when the memory size is smaller than a preset reference value and set to L (Large) in step S112 when the memory size equals the reference value or larger.

In step S120, the installation size of the main memory 107 (memory size or memory amount) is determined. A main memory size MM is set to S (Small) in step S121 when the memory size is smaller than a preset reference value and set to L (Large) in step S122 when the memory size equals the reference value or larger. Note that the memory size of the main memory 107 may be determined by directly finding out the memory size or by finding out whether or not the second main memory 107b is added to say that the memory size is "smaller" than the reference value when the second main memory is not added and "large" when the second main memory is added and the memory size equals the reference value or larger.

Next, the memory arrangement and the input method of the image data of each of the main memory 107 and the sub-memory 105 are selected in step S130. Specifically, a row where each value of the system speed S, the sub-memory size SM, and the main memory size MM matches is searched from a table illustrated in FIG. 6 that is stored in advance in the ROM 102 or the like so that the memory arrangement and the image input method of each of the sub-memory 105 and the main memory 107 are selected.

Figure 6:
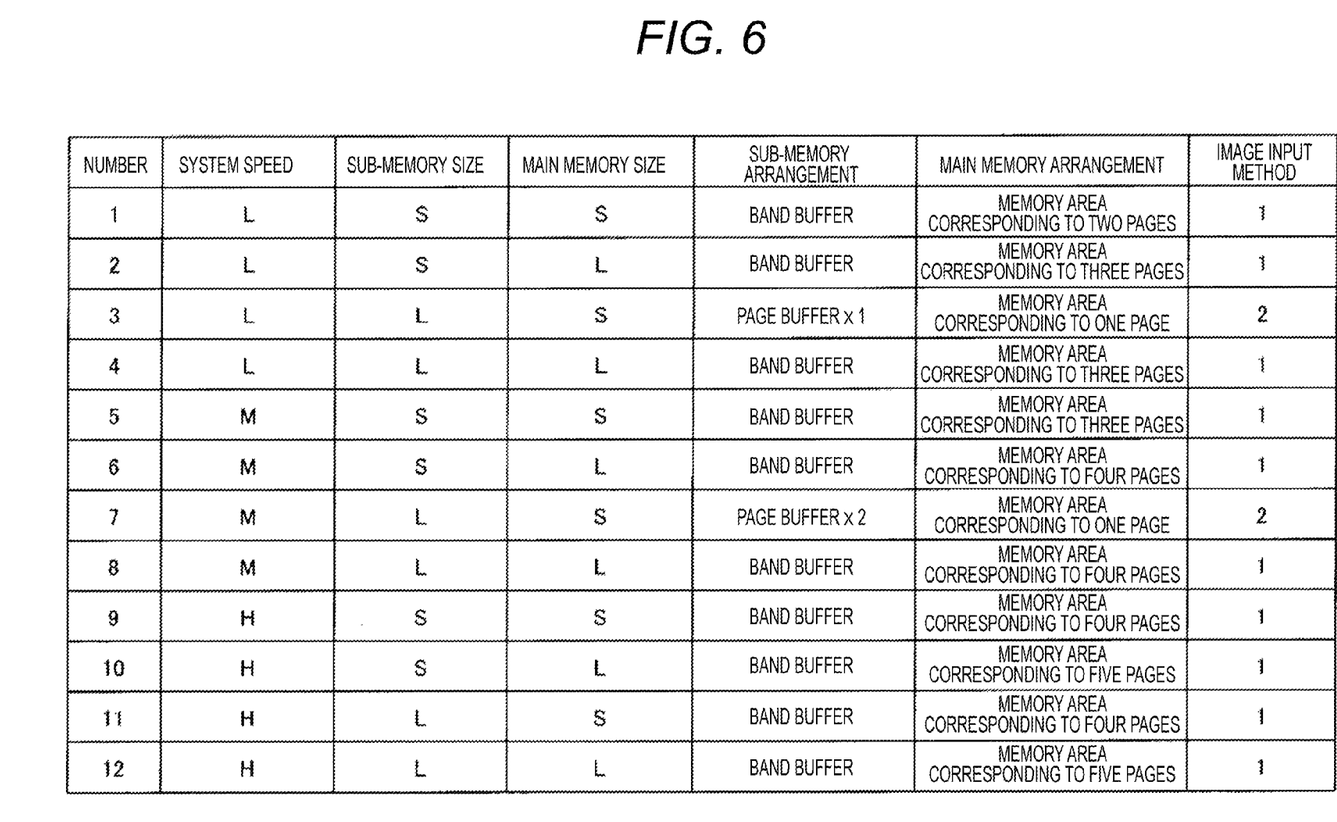
FIG. 6 is a table used to select the arrangement of a memory area secured in each of the main memory and the sub-memory as well as to select an input method of image data.

When the system speed corresponds to the low speed with small sub-memory and main memory size, for example, the memory arrangement of the sub-memory 105 corresponds to the band buffer, the memory arrangement of the main memory 107 corresponds to two pages, and an image input method 1 is selected as indicated by number 1 in the table illustrated in FIG. 6. When the system speed corresponds to the low speed with large sub-memory size and small main memory size, the memory arrangement of the sub-memory 105 corresponds to a single-page buffer, the memory arrangement of the main memory 107 corresponds to a single page, and an image input method 2 is selected as indicated by number 3 in the table illustrated in FIG. 6.

When the main memory 107 is expanded by the addition of the second main memory 107b, the main memory size increases so that the memory arrangement of the sub-memory 105 corresponds to the band buffer, the memory arrangement of the main memory 107 corresponds to three pages, and an image input method 1 is selected as indicated by number 4 in the table illustrated in FIG. 6. Note that the sub-memory 105 may be the single-page buffer in this case. Likewise, the sub-memory 105 may be the two-page buffer in a case of number 8 of the table illustrated in FIG. 6.

Installed in a fixed manner, the sub-memory 105 can be configured at low cost compared to the main memory 107. A system for saving the input image can be constructed at lower cost by securing the memory area capable of saving the single page's worth of image data in the sub-memory.

A memory area capable of saving image data of a plurality of pages can be secured in the main memory 107 when the main memory 107 is expanded, whereby an image can be input at high speed even when the original is large in size.

Figure 7:
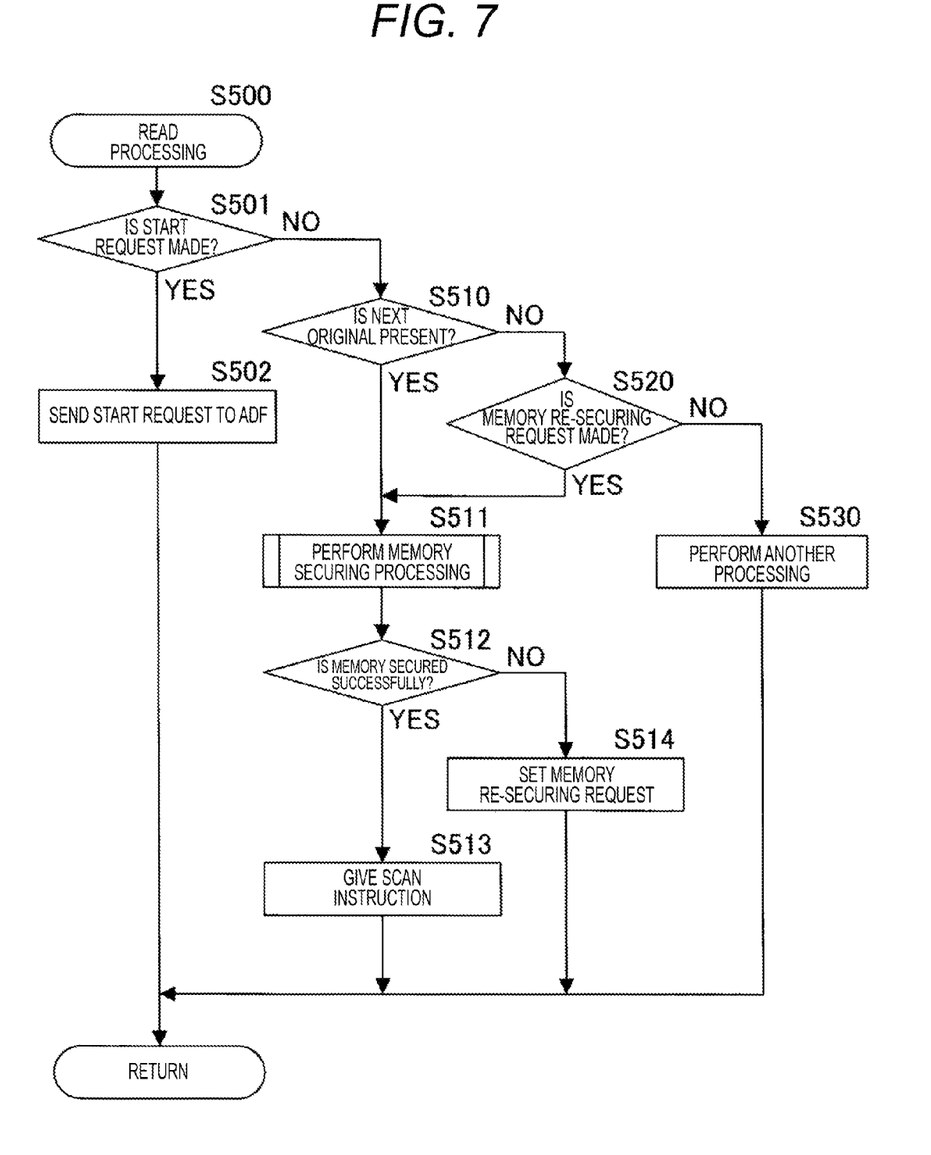
FIG. 7 is a flowchart illustrating the detail of read processing (step S500) in the flowchart illustrated in FIG. 4.

FIG. 7 is a flowchart illustrating the detail of the read processing (step S500) in the flowchart illustrated in FIG. 4.

When it is determined that a start request is made (YES in step S501) after verifying the presence of the start request in step S501, the start request is transmitted to the automatic original feeding unit (ADF) in step S502, and the processing returns thereafter. It is determined whether a next original exists in step S510 when the start request is not made (NO in step S501).

When the next original exists (YES in step S510), memory securing processing of securing a memory area is performed in step S511 to thereafter determine whether the memory area is successfully secured in step S512. Note that the memory securing processing will be described later.

When the memory area is successfully secured (YES in step S512), a scan instruction is given to the ADF in step S513 so that the processing returns thereafter. When the memory area is not successfully secured (NO in step S512), a memory re-securing request is set in step S514 so that the processing returns thereafter.

When the next original does not exist in step S510 (NO in step S510), it is checked whether the memory re-securing request is made in step S520 and, when the memory re-securing request is made (YES in step S520), the processing from step S511 on is performed. When the memory re-securing request is not made (NO in step S520), another processing is performed in step S530 so that the processing returns thereafter.

Figure 8:
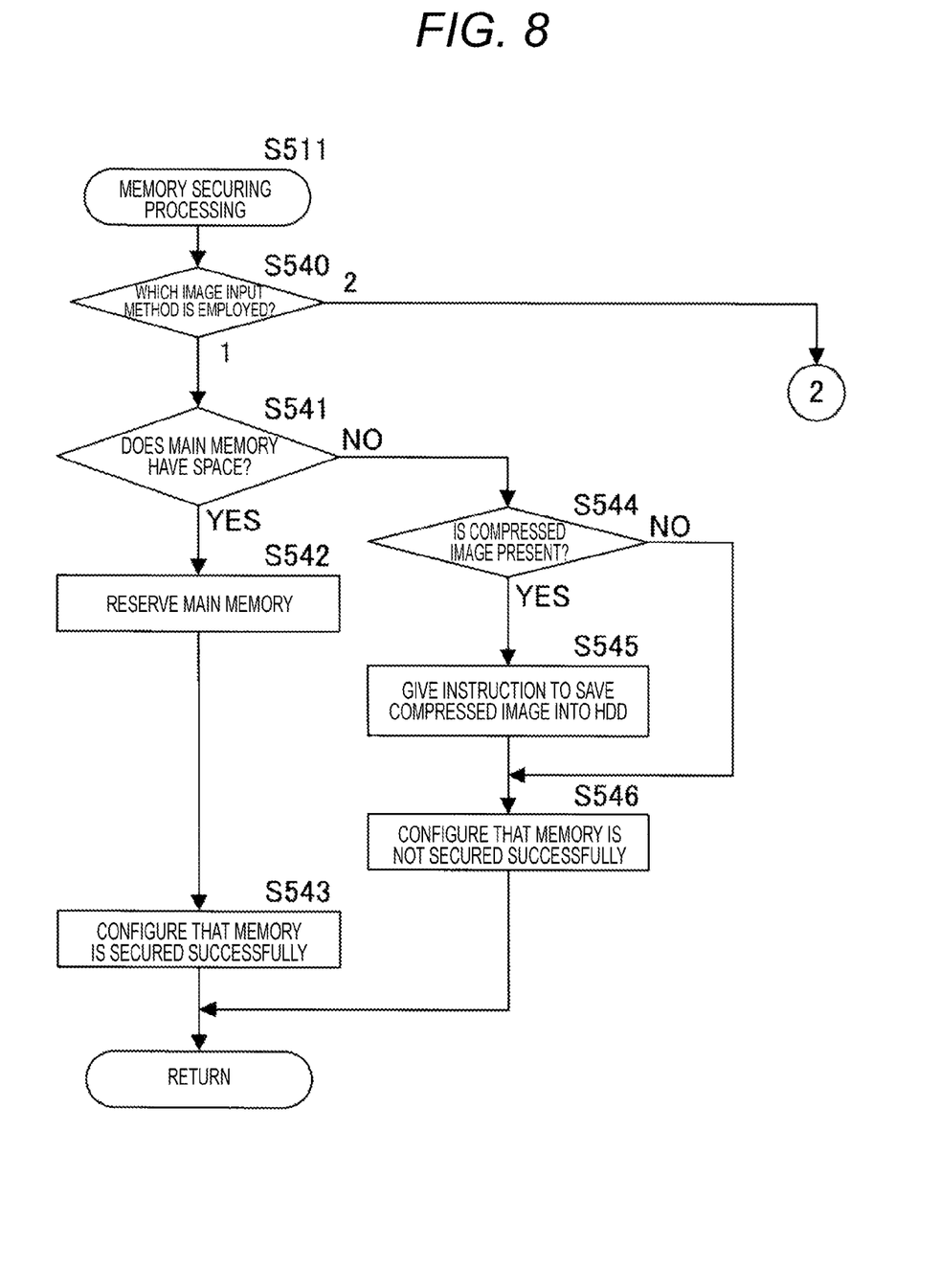
FIG. 8 is a flowchart illustrating the detail of memory securing processing (step S511) in the flowchart illustrated in FIG. 7.

FIG. 8 is a flowchart illustrating the detail of the memory securing processing (step S511) in the flowchart illustrated in FIG. 7.

The image input method is determined in step S540. It is checked whether there is space in the main memory 107 in step S541 when the image input method 1 is employed and, when there is space (YES in step S541), a memory area for saving a single page's worth of image data is reserved in the main memory 107. It is then configured in step S543 that the memory area is successfully secured so that the processing returns thereafter.

When there is no space in the main memory 107 in step S541 (NO in step S541), it is determined in step S544 whether compressed image data is present in the main memory 107. When the compressed image data is present (YES in step S544), a save instruction to save the compressed image data in the non-volatile storage unit 12 is made in step S545, and then the processing proceeds to step S546. The processing directly proceeds to step S546 when the compressed image data is not present (NO in step S544). It is configured in step S546 that the memory area is not successfully secured so that the processing returns thereafter.

The image input method 1 has an effect that the read speed is further increased because the memory area is secured in the main memory 107 such that a plurality of pages' worth of image data can be saved at the maximum capacity, allowing the original to be input one after another.

Figure 9:
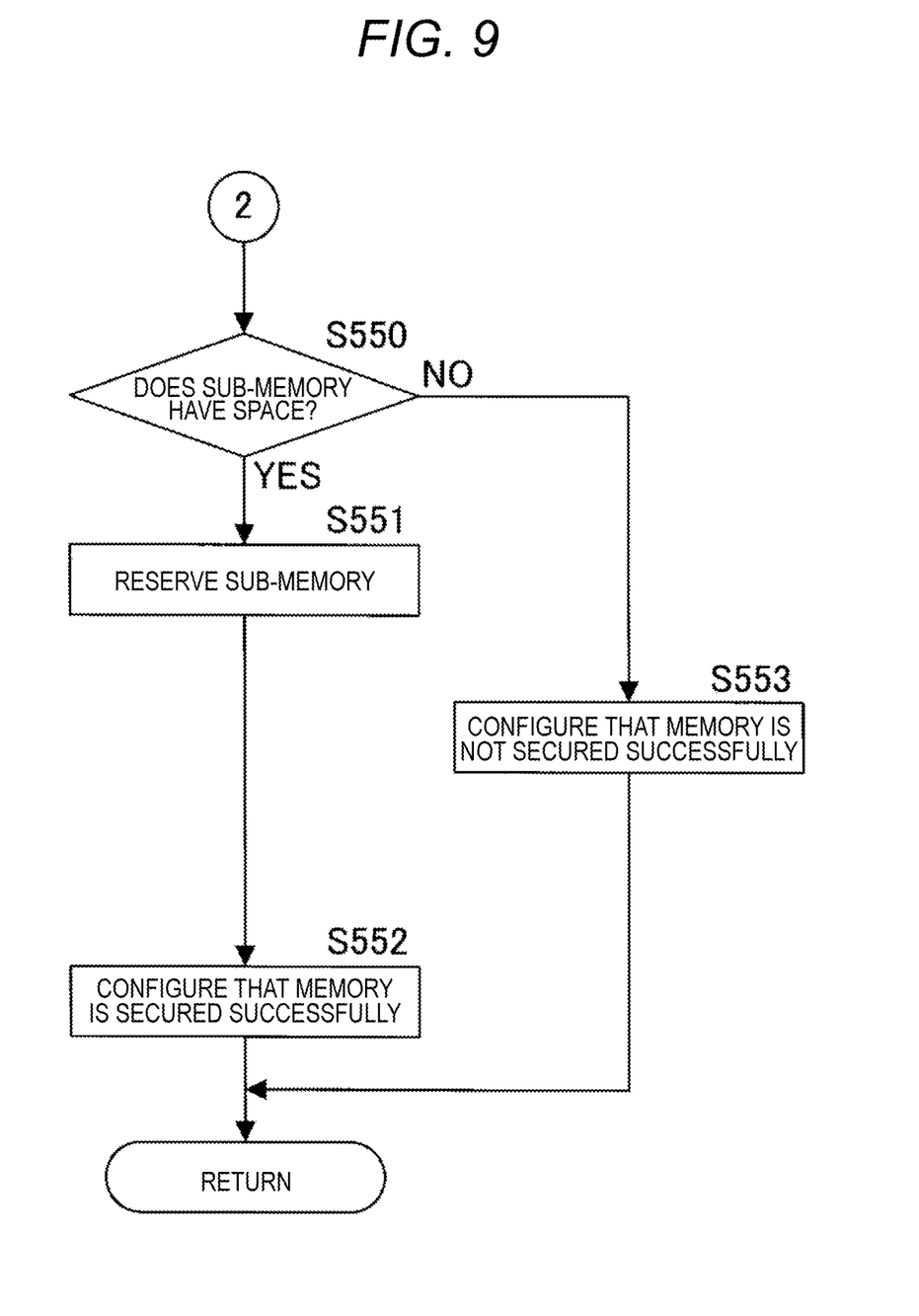
FIG. 9 is the continuation of the flowchart illustrated in FIG. 7.

When the image input method 2 is determined to be employed in step S540, the processing proceeds to step S550 in FIG. 9 where it is checked whether or not there is space in the sub-memory 105. When there is space (YES in step S550), a memory area for saving a single page's worth of image data is reserved in the sub-memory 105 in step S551. It is then configured in step S552 that the memory is successfully secured so that the processing returns thereafter.

When there is no space in the sub-memory 105 (NO in step S550), it is configured in step S553 that the memory is not secured successfully so that the processing returns thereafter.

Figure 10:
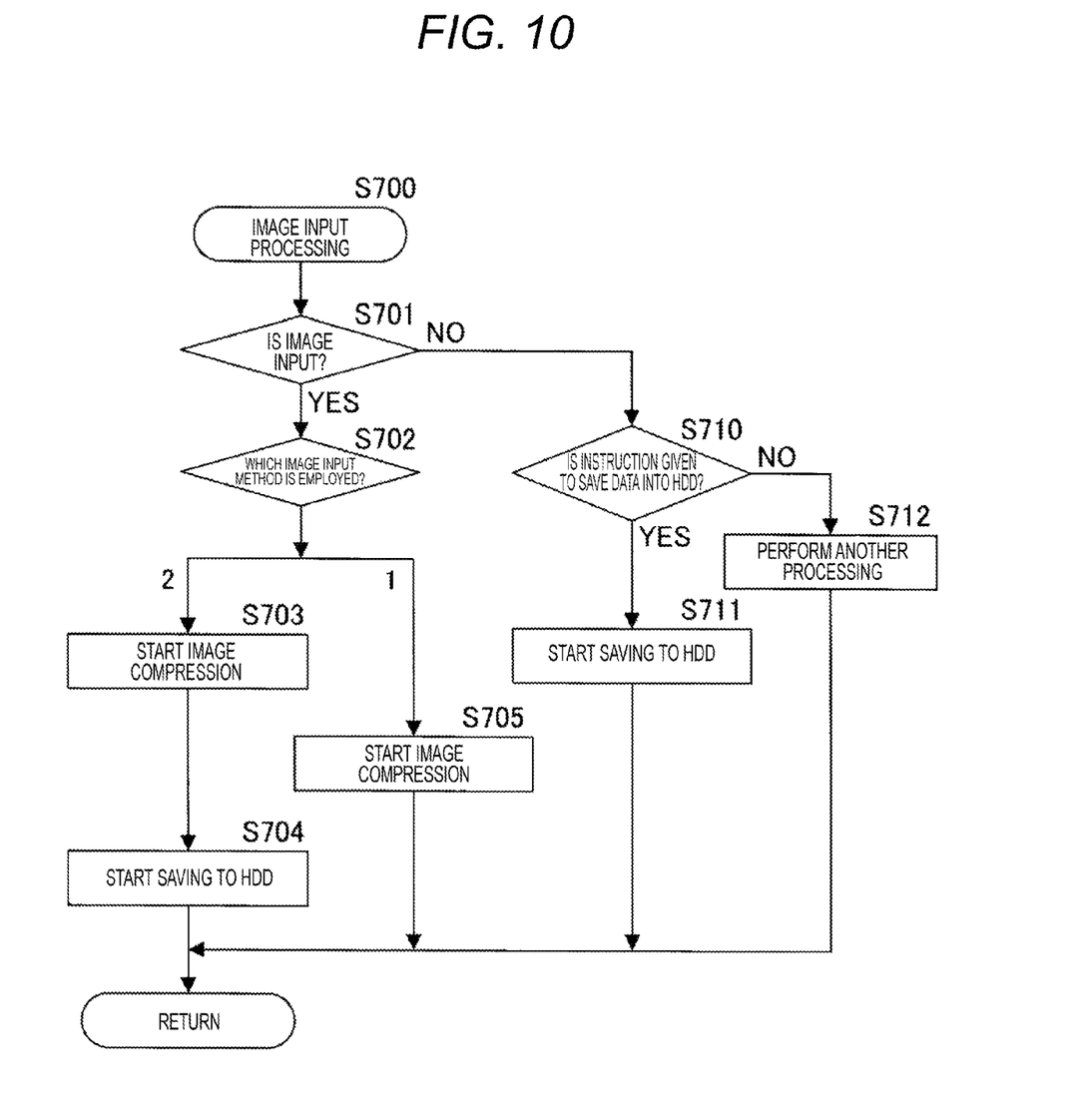
FIG. 10 is a flowchart illustrating the detail of image input processing (step S700) in the flowchart illustrated in FIG. 4.

FIG. 10 is a flowchart illustrating the detail of the image input processing (step S700) in the flowchart illustrated in FIG. 4.

It is determined in step S701 whether an image is input and, when the image is input (YES in S701), the image input method is determined in step S702.

When the image input method 2 is employed, the image data is stored in the sub-memory 105, sent to the compression/decompression unit 106, and then starts to be compressed in step S703. Next in step S704, the compressed portion of the image data is stored in the main memory 107 so that the stored image data starts to be saved into the non-volatile storage unit 12 and that the processing returns thereafter. Note that the image data saved in the non-volatile storage unit 12 is erased from the main memory 107. When the image input method 1 is employed, the image data is stored in the sub-memory 105 and then sent to the compression/decompression unit 106 to start being compressed so that the compressed image data is stored in the main memory 107 and that the processing returns thereafter, in step S705.

When no image is input in step S701 (NO in step S701), it is determined in step S710 whether a save instruction to the non-volatile storage unit 12 is given. When the save instruction is given (YES in step S710), the data starts to be saved into the non-volatile storage unit 12 in step S711. When the save instruction is not given (NO in step S710), the other processing is performed in step S712 so that the processing returns thereafter.

When the image input method 1 is employed, the band buffer is arranged as the sub-memory 105 so that the input image data is compressed per band and saved into the main memory 107. When a memory area needs to be secured for a next read after saving the image data per page into the main memory 107, the instruction is given by the memory securing processing (step S511) illustrated in FIG. 8 to save the image data into the non-volatile storage unit 12. The main memory 107 being capable of saving a plurality of pages' worth of image data, the input image data may be left in the main memory 107, in which case print processing can be performed at high speed as well.

When the image input method 2 is employed, the area capable of saving the image per page is arranged in the sub-memory 105 so that the input image is compressed per band and saved in the main memory 107. The portion of the image data saved per band is saved one by one into the non-volatile storage unit 12 to secure space in the main memory 107, which has the area capable of storing only a single page's worth of the image data, and to make the memory available for use in the print processing or the like, whereby the memory size of the main memory 107 can be decreased to cut down the cost. Moreover, the print processing can be performed while the image data is being input, so that the read/print speed is not decreased too much even when the memory size of the main memory 107 is small.

Accordingly, in the present embodiment, the memory arrangement and the image input method of each of the main memory 107 and the sub-memory 105 are selected on the basis of the system speed of the image processing apparatus 1 and the memory size of the main memory 107 and the sub-memory 105 to execute the input processing of the image data while switching the processing according to the selected memory arrangement and image input method, whereby the control unit 10 as well as the program that are common and applicable to both the inexpensive image processing apparatus and the image processing apparatus equipped with the main memory having the sufficient memory size can be provided. As a result, there is no need to individually fabricate and install a control unit and a program suited for each image processing apparatus, whereby the cost can be decreased.

According to the present embodiment, the optimal input processing can be performed according to the system speed of the image processing apparatus.

According to the present embodiment, the optimal input processing can be performed according to the memory size of each of the main memory unit and the sub-memory unit when the system speed is set to the low speed.

According to the present embodiment, the optimal input processing can be performed according to the memory size of each of the main memory unit and the sub-memory unit when the system speed is set to the middle speed.

According to the present embodiment, the optimal input processing can be performed according to the memory size of the main memory unit when the system speed is set to the high speed.

While one embodiment of the present invention has been described, the present invention is not to be limited to the aforementioned embodiment. There has been described the case where the input image data is the image data of the original read by the scanner unit 11, but may instead be image data received via fax, for example.

According to an embodiment of the present invention, the first input processing and the second input processing are executed while switched therebetween in accordance with the memory size of the main memory unit and the sub-memory unit discriminated by the memory size discrimination unit, the first input processing storing in the sub-memory unit a part of the single page's worth of the image data input by the image input unit, securing in the main memory unit the memory area capable of storing the maximum capacity of the single page's worth of the image data to store the image data stored in the sub-memory unit and encoded by the encoding unit, and securing the memory area capable of storing the maximum capacity of the next single page's worth of the image data in the main memory unit before storing the image data stored in the main memory unit into the non-volatile storage unit, and the second input processing securing in the sub-memory unit the memory area capable of storing the maximum capacity of the image data per page input by the image input unit, temporarily storing the image data formed by encoding a part of the image data stored in the sub-memory unit into the main memory unit, storing the temporarily stored image data into the non-volatile storage unit, and then erasing the temporarily stored image data. As a result, there is no need to individually fabricate the control unit of the image processing apparatus that only performs the first input processing or that only performs the second input processing, thereby allowing the control unit of each image processing apparatus to be standardized and the cost to be reduced accordingly.

According to another embodiment of the present invention, there is no need to individually fabricate the control unit of the image processing apparatus that only performs the first input processing or that only performs the second input processing, thereby allowing the control unit of each image processing apparatus to be standardized and the cost to be reduced accordingly.

According to another embodiment of the present invention, the program which causes the computer of the image processing apparatus to execute the input processing of the image data can be standardized in each image processing apparatus, the input processing being performed while assigning the optimal memory area to each of the main memory unit and the sub-memory unit.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing apparatus comprising:
an image input unit which inputs image data per page; a sub-memory unit which stores the image data input from the image input unit;
an encoding unit which encodes the image data stored in the sub-memory unit;
a main memory unit which stores the image data encoded by the encoding unit;
a non-volatile storage unit which stores the encoded image data stored in the main memory unit; and
a processor which executes processing of discriminating a memory size of the main memory unit and the sub-memory unit and switching between first input processing and second input processing to be executed in accordance with the discriminated memory size of the main memory unit and the sub-memory unit,
wherein the first input processing is processing which stores in the sub-memory unit a part of a single page's worth of the image data input by the image input unit, secures in the main memory unit a memory area capable of storing the maximum capacity of the single page's worth of the image data to store the image data stored in the sub-memory unit and encoded by the encoding unit, and secures a memory area capable of storing the maximum capacity of a next single page's worth of image data in the main memory unit before storing the image data stored in the main memory unit into the non-volatile storage unit, and
the second input processing is processing which secures in the sub-memory unit a memory area capable of storing the maximum capacity of the image data per page input by the image input unit, temporarily stores image data formed by encoding a part of the image data stored in the sub-memory unit into the main memory unit, stores the temporarily stored image data into the non-volatile storage unit, and then erases the temporarily stored image data.

2. The image processing apparatus according to claim 1, wherein the processor switches processing between the first input processing and the second input processing to be executed according to a memory size of each of the main memory unit and the sub-memory unit and a system speed of an own device.

3. The image processing apparatus according to claim 2, wherein the processor executes the first input processing and secures a memory area capable of storing the maximum capacity of two pages' worth of image data in the main memory unit when the system speed is set to a low speed slower than a first predetermined speed and when the discriminated memory size of each of the main memory unit and the sub-memory unit is smaller than a corresponding reference value.

4. The image processing apparatus according to claim 2, wherein the processor executes the second input processing and secures a memory area capable of storing the maximum capacity of a single page's worth of image data in the sub-memory unit when the system speed is set to a low speed slower than a first predetermined speed and when the discriminated memory size of the main memory unit is smaller than a reference value while the discriminated memory size of the sub-memory unit is equal to or larger than a reference value.

5. The image processing apparatus according to claim 2, wherein the processor executes the first input processing and secures a memory area capable of storing the maximum capacity of three pages' worth of image data in the main memory unit when the system speed is set to a low speed slower than a first predetermined speed and when the discriminated memory size of the main memory unit is equal to or larger than a reference value.

6. The image processing apparatus according to claim 2, wherein the processor executes the first input processing and secures a memory area capable of storing the maximum capacity of three pages' worth of image data in the main memory unit when the system speed is set to a middle speed that is equal to or faster than a first predetermined speed and slower than a second predetermined speed, and when the discriminated memory size of each of the main memory unit and the sub-memory unit is smaller than a corresponding reference value.

7. The image processing apparatus according to claim 2, wherein the processor executes the second input processing and secures a memory area capable of storing the maximum capacity of two pages' worth of image data in the sub-memory unit when the system speed is set to a middle speed that is equal to or faster than a first predetermined speed and slower than a second predetermined speed, and when the discriminated memory size of the main memory unit is smaller than a reference value while the discriminated memory size of the sub-memory unit is equal to or larger than a reference value.

8. The image processing apparatus according to claim 2, wherein the processor executes the first input processing and secures a memory area capable of storing the maximum capacity of four pages' worth of image data in the main memory unit when the system speed is set to a middle speed that is equal to or faster than a first predetermined speed and slower than a second predetermined speed, and when the discriminated memory size of the main memory unit is equal to or larger than a reference value.

9. The image processing apparatus according to claim 2, wherein the processor executes the first input processing and secures a memory area capable of storing the maximum capacity of four pages' worth of image data in the main memory unit when the system speed is set to a high speed equal to or faster than a second predetermined speed and when the discriminated memory size of the main memory unit is smaller than a reference value.

10. The image processing apparatus according to claim 2, wherein the processor executes the first input processing and secures a memory area capable of storing the maximum capacity of five pages' worth of image data in the main memory unit when the system speed is set to a high speed equal to or faster than a second predetermined speed and when the discriminated memory size of the main memory unit is equal to or larger than a reference value.

11. An image processing method employed by an image processing apparatus, comprising:
an image input step of inputting image data per page;
a step of storing in a sub-memory unit the image data input in the image input step;
an encoding step of encoding the image data stored in the sub-memory unit;
a step of storing in a main memory unit the image data encoded in the encoding step;
a step of storing in a non-volatile storage unit the encoded data stored in the main memory unit;
a memory size discrimination step of discriminating a memory size of the main memory unit and the sub-memory unit; and
a control step of executing processing while switching between first input processing and second input processing in accordance with the discriminated memory size of the main memory unit and the sub-memory unit,
wherein the first input processing is processing which stores in the sub-memory unit a part of a single page's worth of the image data input in the image input step, secures in the main memory unit a memory area capable of storing the maximum capacity of the single page's worth of the image data to store the image data stored in the sub-memory unit and encoded in the encoding step, and secures a memory area capable of storing the maximum capacity of a next single page's worth of image data in the main memory unit before storing the image data stored in the main memory unit into the non-volatile storage unit, and
the second input processing is processing which secures in the sub-memory unit a memory area capable of storing the maximum capacity of the image data per page input in the image input step, temporarily stores image data formed by encoding a part of the image data stored in the sub-memory unit into the main memory unit, stores the temporarily stored image data into the non-volatile storage unit, and then erases the temporarily stored image data.

12. The image processing method according to claim 11, wherein, in the control step, the first input processing and the second input processing are switched to be executed according to a memory size of each of the main memory unit and the sub-memory unit and a system speed of an own device.

13. A non-transitory recording medium storing a computer readable image processing program which causes a computer of an image processing apparatus to execute:
an image input step of inputting image data per page;
a step of storing in a sub-memory unit the image data input in the image input step;

an encoding step of encoding the image data stored in the sub-memory unit;

a step of storing in a main memory unit the data encoded in the encoding step;

a step of storing in a non-volatile storage unit the encoded image data stored in the main memory unit;

a memory size discrimination step of discriminating a memory size of the main memory unit and the sub-memory unit; and a control step of executing processing while switching between first input processing and second input processing in accordance with the discriminated memory size of the main memory unit and the sub-memory unit, wherein the first input processing is processing which stores in the sub-memory unit a part of a single page's worth of the image data input in the image input step, secures in the main memory unit a memory area capable of storing the maximum capacity of the single page's worth of the image data to store the image data stored in the sub-memory unit and encoded in the encoding step, and secures a memory area capable of storing the maximum capacity of a next single page's worth of image data in the main memory unit before storing the image data stored in the main memory unit into the non-volatile storage unit, and the second input processing is processing which secures in the sub-memory unit a memory area capable of storing the maximum capacity of the image data per page input in the image input step, temporarily stores image data formed by encoding a part of the image data stored in the sub-memory unit into the main memory unit, stores the temporarily stored image data into the non-volatile storage unit, and then erases the temporarily stored image data.

14. The non-transitory recording medium storing a computer readable program according to claim 13, wherein, in the control step, the first input processing and the second input processing are switched to be executed according to a memory size of each of the main memory unit and the sub-memory unit and a system speed of an own device.

\* \* \* \* \*